No. 619,156. Patented Feb. 7, 1899.
J. P. FELL.
SHIPPING TAG.
(Application filed Dec. 31, 1897.)
(No Model.)
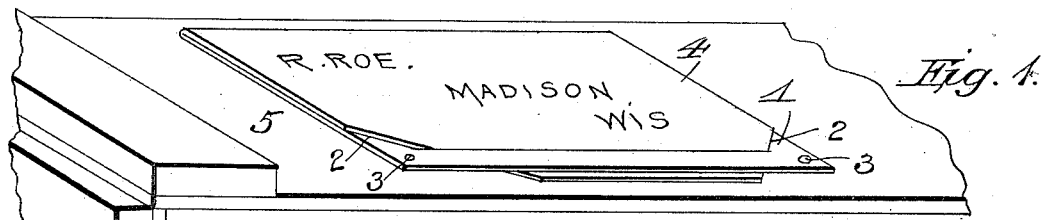
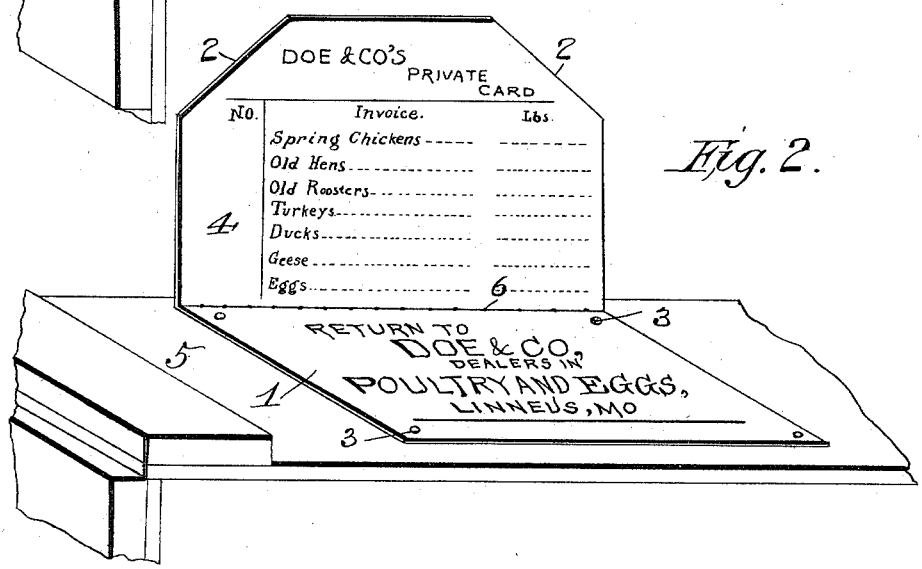
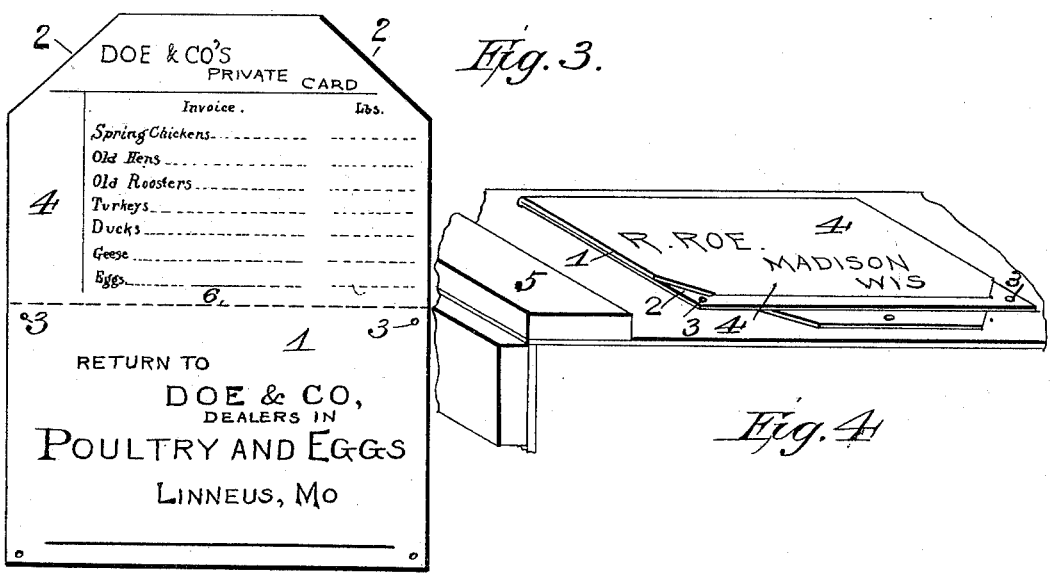
Witnesses:
Franck L. Ourand
Jo. L. Coombs
Inventor:
Jasper P. Fell,
Louis Bagger & Co.,
Attorneys.

UNITED STATES PATENT OFFICE.

JASPER P. FELL, OF LINNEUS, MISSOURI.

SHIPPING-TAG.

SPECIFICATION forming part of Letters Patent No. 619,156, dated February 7, 1899.

Application filed December 31, 1897. Serial No. 664,997. (No model.)

*To all whom it may concern:*

Be it known that I, JASPER P. FELL, a citizen of the United States, and a resident of Linneus, in the county of Linn and State of Missouri, have invented certain new and useful Improvements in Shipping-Tags; and I do hereby declare that the following is a full, clear, and exact description of the invention, which will enable others skilled in the art to which it appertains to make and use the same, reference being had to the accompanying drawings, which form a part of this specification.

My invention relates to shipping-tags, more especially designed for use with crates or boxes for the transportation of poultry, eggs, and other similar merchandise, which crates or boxes are to be returned to the shipper.

The object of the invention is to provide a shipping-tag adapted to receive the name of the shipper and be attached to a crate or box and provided with a detachable invoice-flap adapted to receive the name of the consignee on its outer side, which flap is removed and kept by the consignee when the crate arrives at its destination, exposing the return request on the tag secured to the crate.

The invention consists, essentially, in a shipping-tag having a slit near one edge and adapted to receive the name of the owner or shipper and at the opposite end or side provided with a detachable flap adapted to receive an invoice on one side and the name and address of the consignee upon the opposite side, the free edge of said flap adapted to be inserted in or passed through said slit, as hereinafter fully described and claimed.

In the accompanying drawings, Figure 1 is a perspective view of a portion of a shipping crate or box provided with a tag made in accordance with my invention. Fig. 2 is a similar view showing the edge of the invoice-flap removed from the slit in the tag and the flap ready to be detached from the tag. Fig. 3 is a view of the tag before the flap is folded. Fig. 4 is a perspective view showing the edge of the flap extending beyond the tag and tacked to the crate.

In the said drawings the reference-numeral 1 designates the tag, preferably rectangular in form and provided with a longitudinal slit near one edge. The opposite edge is cut away at the corners, as seen at 2, and the tag provided with a number of perforations 3, forming a detachable flap 4. The upper side of the tag, or that side upon which the flap folds, is adapted to receive the name of the shipper of the crate or box 5 to which the tag is secured, while the flap on its inner side is adapted to receive an invoice of the goods or merchandise contained in the crate, while the outer side is adapted to receive the name of the consignee. These names, addresses, and invoices are preferably printed on the tag and flap, as shown, for convenience and the saving of time and labor in writing the same; but this is not essential. The tag may also be perforated at 6 to enable the flap to be easily detached.

In using the device the tag is tacked to the crate or box, and the flap containing the invoice is folded down upon the same and its edge passed through the slit in the tag, the invoice and the name of the shipper being concealed and the name of the consignee exposed, as seen in Fig. 1. When the crate or box arrives at its destination, the flap is disengaged from the slit, as seen in Fig. 2, and can then be detached by tearing at the line of perforations and retained by the consignee, while the tag, with shipper's name, address, and return request exposed, remains on the crate.

To insure against accidental disengagement of the flap from the slit, I extend the edge of the flap beyond the edge of the tag, as seen in Fig. 4, and tack said edge to the crate.

A tag constructed as described will effect a great saving in time and labor, as it is not necessary to make out a separate invoice and send by mail and also attach a separate tag to the crate containing the consignee's name and address. Again, the invoice being attached to the crate will avoid confusion and delay in hunting up the same, as is now the case when the invoice is sent by mail.

Having thus described the invention, what I claim is—

As an improved article, a shipping-tag formed with a slit near one end and adapted to be tacked to a shipping crate or box and having printed on its upper side the name and address of the shipper, and provided with a detachable folding flap having a blank invoice printed on its inner side and the name and address of the consignee of the box or crate on its outer side, and the edge of said flap cut
5 away at the corners and adapted to be passed through said slit, substantially as described.

In testimony that I claim the foregoing as my own I have hereunto affixed my signature in presence of two witnesses.

JASPER P. FELL.

Witnesses:
   DAVID B. ORMISTON,
   VEM E. GREGG.